(12) United States Patent
Norton (10) Patent No.: US 10,261,275 B2
(45) Date of Patent: Apr. 16, 2019

(54) BAFFLE WITH OPTICAL CONNECTOR

(71) Applicant: Hewlett Packard Enterprise Development LP, Houston, TX (US)

(72) Inventor: John Norton, Houston, TX (US)

(73) Assignee: Hewlett Packard Enterprise Development LP, Houston, TX (US)

(*) Notice: Subject to any disclaimer, the term of this patent is extended or adjusted under 35 U.S.C. 154(b) by 0 days.

(21) Appl. No.: 15/565,962

(22) PCT Filed: May 11, 2015

(86) PCT No.: PCT/US2015/030175
§ 371 (c)(1),
(2) Date: Oct. 12, 2017

(87) PCT Pub. No.: WO2016/182556
PCT Pub. Date: Nov. 17, 2016

(65) Prior Publication Data
US 2018/0106975 A1    Apr. 19, 2018

(51) Int. Cl.
*G02B 6/42* (2006.01)
*G02B 6/38* (2006.01)
*G02B 6/44* (2006.01)

(52) U.S. Cl.
CPC ......... *G02B 6/4268* (2013.01); *G02B 6/3825* (2013.01); *G02B 6/3897* (2013.01); *G02B 6/4292* (2013.01); *G02B 6/4452* (2013.01); *G02B 6/4471* (2013.01); *G02B 6/4448* (2013.01)

(58) Field of Classification Search
None
See application file for complete search history.

(56) References Cited

U.S. PATENT DOCUMENTS

| | | | |
|---|---|---|---|
| 7,457,126 B2 | 11/2008 | Ahrens | |
| 7,458,733 B2* | 12/2008 | Anderl | H04B 10/806 361/688 |
| 7,991,252 B2 | 8/2011 | Cheng | |
| 8,353,722 B1 | 1/2013 | Lan | |
| 8,475,246 B2 | 7/2013 | Mayer | |
| 8,923,013 B2* | 12/2014 | Anderson | G02B 6/4452 361/728 |

(Continued)

FOREIGN PATENT DOCUMENTS

WO    WO-2013162605    10/2013

OTHER PUBLICATIONS

De Lorenzo, D.S., "Thermal Design of a high-density server", IEEE Transactions on Components and Packaging Technologies (vol. 25, Issue: 4, Dec. 2002).

*Primary Examiner* — Chad H Smith
(74) *Attorney, Agent, or Firm* — International IP Law Group, PLLC (57) ABSTRACT

Examples disclosed herein relate to a baffle with an integrated optical connector. One example includes a component to attach to an interconnect device where the component allows a heat exchanging medium to flow through an opening in itself. This example can include a slot in the component for integration of an optical connector into the component. The slot can also be used to secure the optical connector to the interconnect device and to align the optical connector to enable communication with the interconnect device.

12 Claims, 7 Drawing Sheets

(56) References Cited

U.S. PATENT DOCUMENTS

| | | |
|---|---|---|
| 2008/0062640 A1 | 3/2008 | Anderl |
| 2008/0069501 A1* | 3/2008 | Mudd .................. G02B 6/3825 |
| | | 385/75 |
| 2013/0000865 A1* | 1/2013 | Shi ....................... G02B 6/4246 |
| | | 165/67 |
| 2014/0037251 A1 | 2/2014 | Isenhour |
| 2014/0056592 A1 | 2/2014 | McColloch |
| 2014/0116773 A1 | 5/2014 | Yang |
| 2015/0124404 A1 | 5/2015 | Shen |
| 2016/0202441 A1* | 7/2016 | Claessens ............ G02B 6/4477 |
| | | 385/113 |

* cited by examiner

BAFFLE WITH OPTICAL CONNECTOR

BACKGROUND

A computing device or interconnect device using electrical power generates heat as the flow of electrons meets resistance from wiring, resistors, and other computing components. For optimal operation, this heat is moved away from the electrical components and often outside the computing device. A baffle is a vane, panel, or other structure that can direct the flow of the medium moving the heat.

DESCRIPTION OF THE DRAWINGS

Certain exemplary embodiments are described in the following detailed description and in reference to the drawings, in which.

DETAILED DESCRIPTION

Baffles can provide support to a computing device and can also guide a cooling medium through openings in itself. An optical connector terminates the end of an optical fiber component such as an optical fiber, and can enable quicker connection and disconnection to a signal receiver or another optical fiber when compared to splicing. An optical connector can mechanically couple and align the cores of optical fibers providing networking capability to the interconnect device.

Interconnect devices, such as switches have often used metal wiring and computing units to transmit communicative signals. Accordingly, interconnect devices would use a printed circuit assembly (PCA) or a printed circuit board (PCB) in order to facilitate the usage of these materials for networking functions.

Examples described herein provide techniques by which an optical connector is integrated into a baffle. The disclosed baffle can provides mechanical support and alignment for optical connectors and manages airflow into the interconnect device. The baffle can be constructed of plastic and can include high rigidity mechanical support for multiple optical connectors. The baffle can mate to the PCA of the interconnect device with screws or any other suitable attaching method. In some examples, the PCA can be replaced with a generic material such as plastic or other suitable structured material because there may no longer be electrical networking wiring to be printed into a circuit board or assembly.

Figure 1:
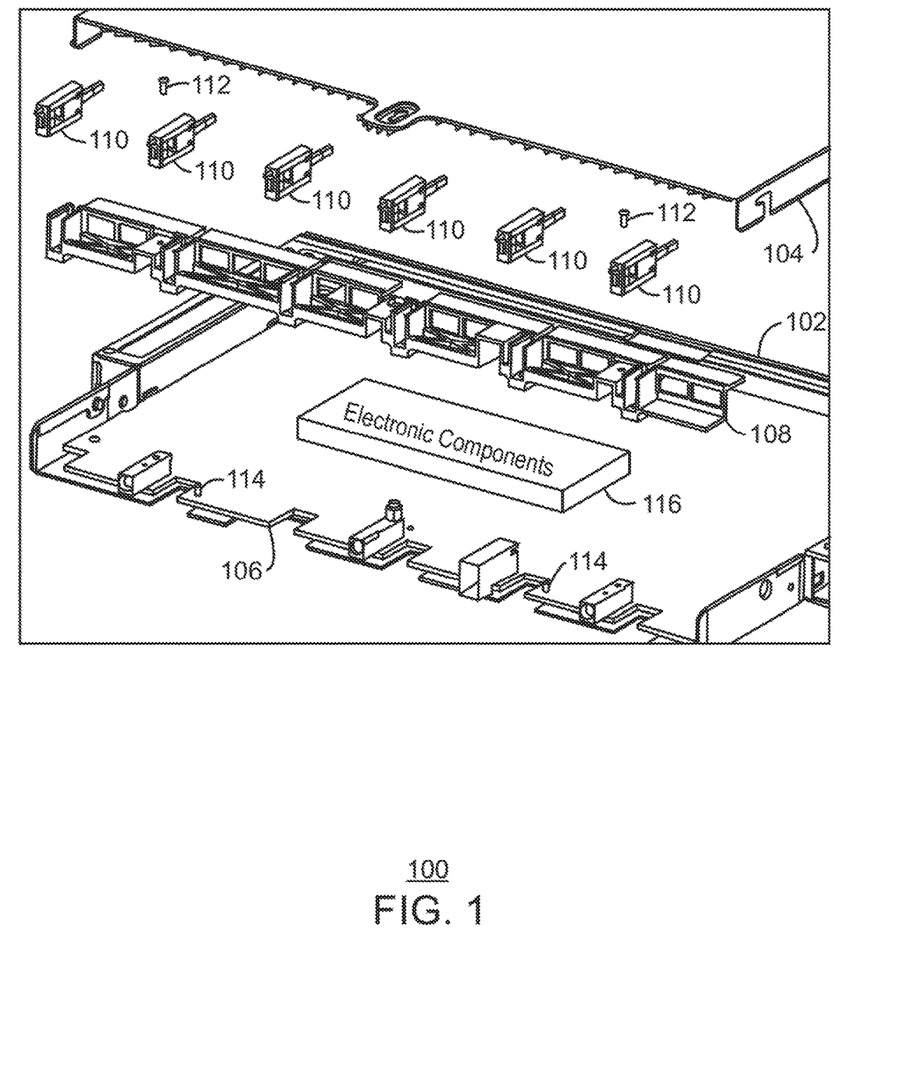
FIG. 1 is an exploded view diagram of an example interconnect device including a baffle with optical connectors.

FIG. 1 is an exploded view diagram of are example interconnect device 100 including a baffle with optical connectors. The interconnect device 100 be a switch, a blade, switch, a server, a personal computer, or any other computing device that generates heat and is able to receive optical fiber connections.

The interconnect device 100 can include an enclosure 102 to hold the parts of the interconnect device 100. In some examples, the enclosure 102 is an outer casing that helps to modularize the interconnect device 100 allowing installation of the interconnect device within larger systems such as server racks. The interconnect device 100 can also include a hood 104 to cover the parts of the interconnect device 100. In some examples, the hood 104 can be attached to the enclosure 102 to create an encasing of the parts of the interconnect device 100. The hood 104 can provide a smoother more sturdy and uniform covering for the interconnect device 100 such that other equipment may be placed on top of the interconnect device 100. The hood 104 can also be shaped to suit the environment in which the interconnect device 100 is intended to operate. For example, if the interconnect device 100 is intended to operate in a server rack, the exterior of the hood may be shaped to allow the interconnect device 100 to slide into a space of the server rack.

The interconnect device 100 can also include a panel 106. In some examples the panel 106 can be a printed circuit board (PCB), a printed circuit assembly (PCA), or similar part capable of mechanically supporting and electrically connecting electronic components using conductive tracks or other substrates laminated onto a non-conductive substrate. In other examples, the panel 106 can be a generic material such as a plastic such as high impact polystyrene (HIPS) or other suitable material for supporting a structure and withstanding high temperature.

The interconnect device 100 includes a component, which can also be called a baffle 108 that integrates at least one optical connector 110. The baffle 108 may need to provide support for the optical connector 110 and also be able to withstand heat typical for the interconnect device 100 of the baffle 108. Accordingly, the composition of the baffle 108 can be rigid, strong, but can also be somewhat flexible depending on the needs of the particular interconnect device 100. Further the baffle can be plastic such as high impact polystyrene (HIPS) or other suitable material for withstanding high temperature.

The baffle 108 includes at least one slot to integrate the optical connectors 110. The optical connectors 110 can terminate the end of an optical fiber and enables connection of the optical signal to the interconnect device 100 without an intermediate device or structure. The optical connectors 110 can each be a blind mate connector or other type of optical connector 110. The incorporation of the optical connector 110 into a slot of the baffle 108 can involve fastening via an optical connector fastener, and can also enable the optical fiber to pass through the baffle 108 itself and into an interface of the interconnect device 100 to receive the optical signal.

The baffle 108 can be attached to the panel 106 by mounting screws 112 or other suitable means of attachment. The attachment of the baffle 108 to the panel 106 can help align the optical connectors and mechanically couple the cores of fibers so light can pass. Further the attachment of the baffle 108 to the panel 106 can aid in strengthening the structure of the interconnect device 100 which can protect the encased parts of the interconnect device 100.

The interconnect device 100 can include a component alignment feature 114. In some examples, the component alignment feature 114 guides the baffle 108 into a designated position. The guiding aids in positioning the baffle 108 prior_ to the encasing with the hood 104 or the attaching of the baffle 108 to the panel 106 with the mounting screws 112. The component alignment feature 114 can be a pin that juts out from the panel 106, a notch, or any other suitable means for guiding the baffle 108 into the baffle position on the panel 106. In some examples the component alignment feature 114 also called a baffle alignment feature is a part of the panel 106, however it can also be separate or a part of the interconnect device enclosure 102.

The interconnect device 100 can enable optical connection to electronic components 116 mounted on the panel 106 and housed between the hood 104 and the enclosure 102. These electronic components can be processors, circuitry, modules, memory, storage, or any other electronic device used in the connection and communication of signals through the optical connectors 110 and an optical fiber.

Figure 2:
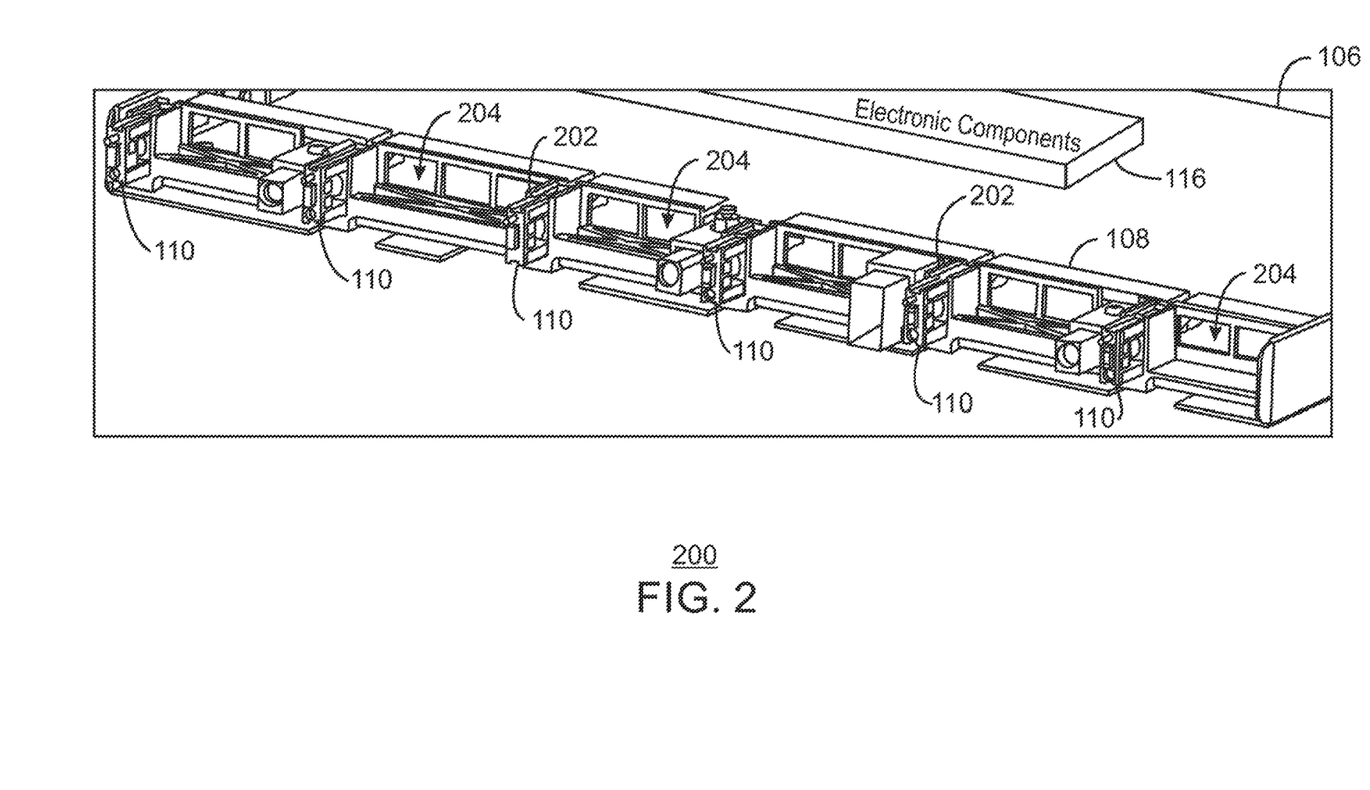
FIG. 2 is an example diagram of a partially installed baffle with optical connectors.

FIG. 2 is an example diagram 200 of a partially installed baffle 108 with optical connectors 110. The baffle 108 shown here does not include a hood 104 attached to the enclosure 102 of the interconnect device 100. Like numbered items are as described in FIG. 1.

The baffle 108 can include fasteners 202 to fasten the optical connector 110 into place. The fasteners 202 are shown in FIG. 2 as latches that can snap into place at the top of slots in the baffle 108. In some examples, the fasteners 202 can each be a movable hook, latch, adhesive, or other mechanism or compound that secures the optical connector 110 into the baffle 108. In some examples, the slot of a baffle 108 can be snug enough that the friction between the baffle 108 and the optical connector 110 may provide sufficient securing force. The insertion and fastening of the optical connector 110 into the baffle 108 can also align the optical connector 110 with the interconnect device 100. In some examples, the optical connector 110 may connect properly with an optical signal interface of the interconnect device 100 once it is fastened to the baffle 108 and the baffle attached to the panel 106.

The example diagram 200 shows a view of openings 204 in the baffle 108. Each of these openings 204 enables the flow of a heat exchanging medium through the baffle 108. In some examples the heat exchanging medium is air, but it can be any gas or liquid that flows through a computing device to aid cooling. Each opening 204 can be sized depending on the particular interconnect device 100 and baffle 108 installation. For interconnect devices 100 that produce more heat, the openings 204 can be made larger to allow greater speed of movement for a cooling medium. For interconnect devices 100 that produce less heat, the openings 204 can be made smaller to allow for a smaller form factor baffle 108 to be used. This variability in openings 204 enables both implementation in both large and small versions of the interconnect device 100. Alternatively, if a cooling cycle is cyclical, the smaller opening 204 may aid in keeping dust or other debris out of the interconnect device 100.

Figure 3:
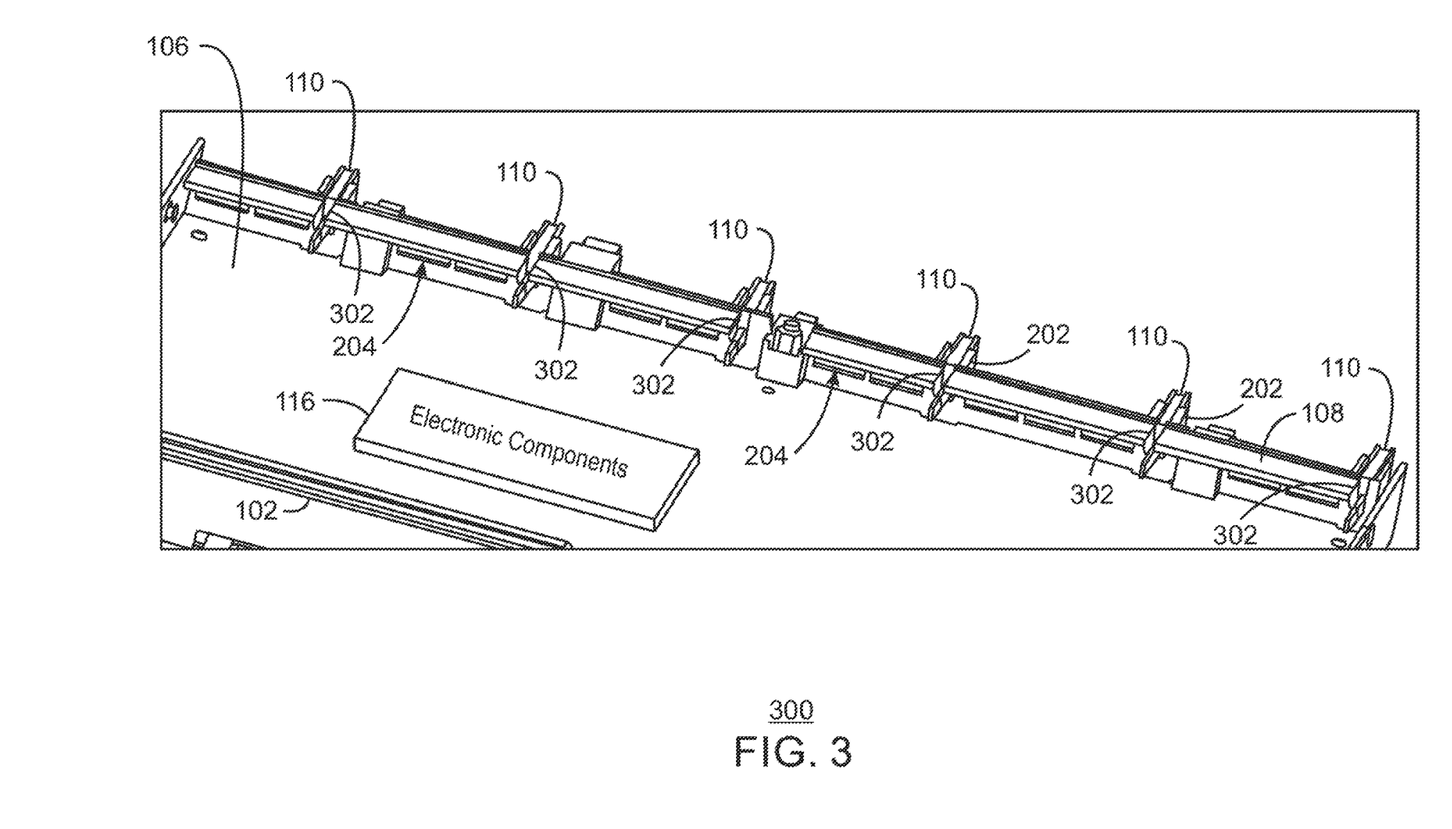
FIG. 3 is an example diagram of a baffle with inserted optical connector.

FIG. 3 is an example diagram 300 of a baffle 108 with inserted optical connectors 110. Like numbered items are as described in FIG. 1 and FIG. 2.

In addition to providing an alternate view of how an optical connector 110 can be integrated into a baffle 108 and pass through the baffle 108, FIG. 3 also illustrates a cable channel 302. In examples where the optical connectors 110 will not likely be serviced, maintained, or replaced, an optical connector 110 can simply be inserted into a slot of a baffle 108. However, in some examples a user may wish to install newer versions of optical connectors, replace malfunctioning optical connectors, maintain, repair, remove, or otherwise access the optical connectors. Accordingly, in some examples, the baffle 108 can include at least one cable channel 302.

The cable channel 302 allows the sliding in and out of an optical connector from the slot in the baffle 108. The cable channel 302 can allow the insertion and removal of the optical connector 110 even when the interconnect device 100 is partially assembled or fully assembled depending on the particular cable channel 302 and optical connector 110.

Partially assembled interconnect devices 100 can have a detached hood 104 with a baffle 108 still attached to the panel 106 and the panel attached to the enclosure 102. Fully assembled interconnect devices 100 can include both the hood 104 and the enclosure 102 fully installed and connected together encasing the parts of the interconnect device 100. In either case, if the optical connector 110 can be moved out of the fasteners 202 and moved out of the slot of the baffle 108 through the cable channel 302 then removal is possible even though the interconnect device 100 is fully assembled. The cable channel 302 can be aligned with the slot of the baffle 108 or unaligned such that insertion of the optical device involves navigation of the cable channel 302. An unaligned cable channel 302 of a baffle 108 can aid in securing and aligning the optical connector 110 into a proper position.

Figure 4:
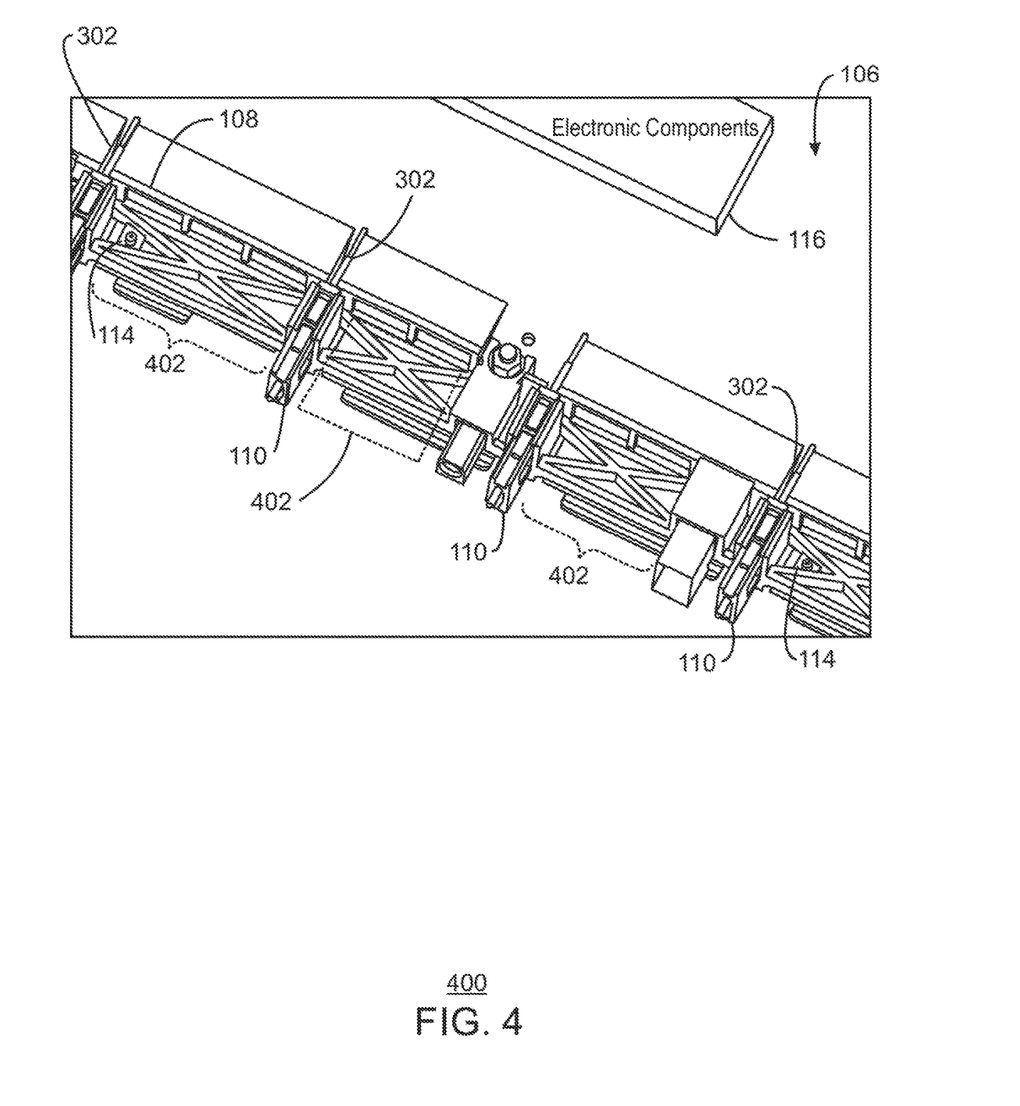
FIG. 4 is a diagram of an example baffle showing structure supports.

FIG. 4 is a diagram 400 of an example baffle 108 showing structure supports. Like numbered items are as described in FIG. 1 and FIG. 3.

Insertion of an optical connector 110 into the baffle 108 can involve an amount of force to overcome friction, fasteners 202, or to ensure a flush connection in the slot of the baffle 108. Accordingly, a structure support 402 can be included in the baffle 108 design. While the slot of the baffle 108 can be flexible to allow the insertion of an optical connector 110, the baffle itself can be designed to act as a supporting wall of the interconnect device 100. Indeed, while the hood 104 and the enclosure 102 encapsulate most faces of the interconnect device 100, the baffle 108 can be inserted into the remaining wall. While the baffle 108 allows cooling medium to flow through it, the baffle 108 may also be relied upon to provide the interconnect device 100 with a supported structure for general use. This general use can involve handling by inexperienced users, shipping, being dropped, incorrect installation attempts, and other similar forces of general occurrence. Furthermore, a baffle 108 securing an optical connector 110 containing an optical fiber can use support to ensure an extreme bend radius is not breached causing damage to the optical fiber and degrading the optical signal. In some examples, if a baffle were too flexible, an optical connector 110 could become misaligned resulting in degradation or loss of an optical signal. The structure support 402 can be used to strengthen and support the slot of the baffle 108, the optical connector 110 position, as well as the baffle 108 and interconnect device generally.

In FIG. 4, the structure support 402 shown takes the shape of Xs on the baffle 108 when viewed from above. The support structures can be part of the baffle 108, interconnect device 100, panel 106, or any other suitable part for providing support. The composition of the structure support 402 can be rigid and can be the same as the baffle or other material suitable for providing support and structure to the baffle 108 and integrated optical connectors 110.

Figure 5:
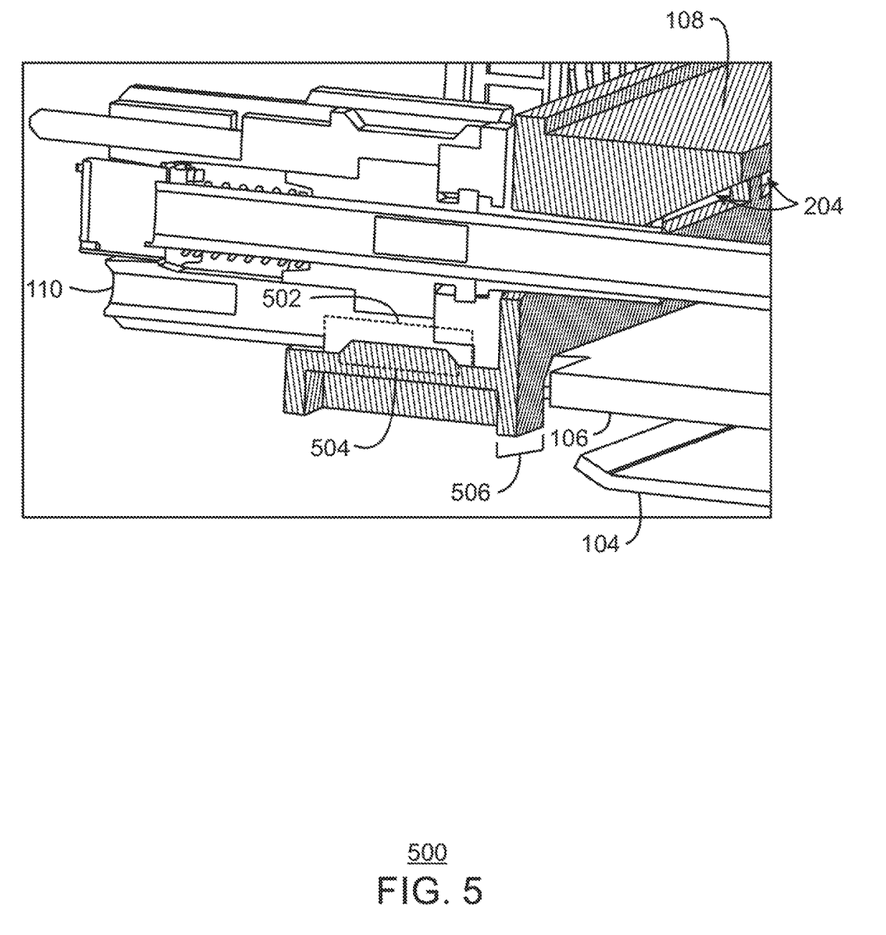
FIG. 5 is a close up diagram of an example integrated optical connector.

FIG. 5 is a close up diagram 500 of an example integrated optical connector 110. Like numbered items are as described in FIG. 1 and FIG. 2.

An optical connector 110 that is properly aligned provides a stronger optical signal. In order to ensure proper alignment in the baffle 108, the slot of the baffle 108 can include alignment features. These alignment features can be part of the present components or can be additional components included to ensure proper security and alignment of the parts of the interconnect device 100. In examples, the optical connector alignment feature 502 can be paired to a mirroring component alignment feature 504. The mirroring shown in FIG. 5, can aid in proper insertion and securing of the optical connector 110 to the proper position in the slot of the baffle 108. While a trapezoid shape is shown, other alignment features can be used including pins, notches, additional shapes, or any other suitable alignment technology that would not interfere with the operation of the optical connector 110.

An additional component alignment feature 506 is shown aiding the alignment of the baffle 108 on the panel. In FIG. 5, the additional component alignment feature 506 is a molded hook shape that fits into a cut out area of the panel 106. In addition to the mounting screws 112, the additional component alignment feature 506 can aid in securing, mounting, and aligning the baffle 108. This alignment can aid placement of the baffle 108 into the correct position on the panel 106 to optimize the optical signal transmitted by an optical connector 110 that is integrated into the baffle 108.

Figure 6:
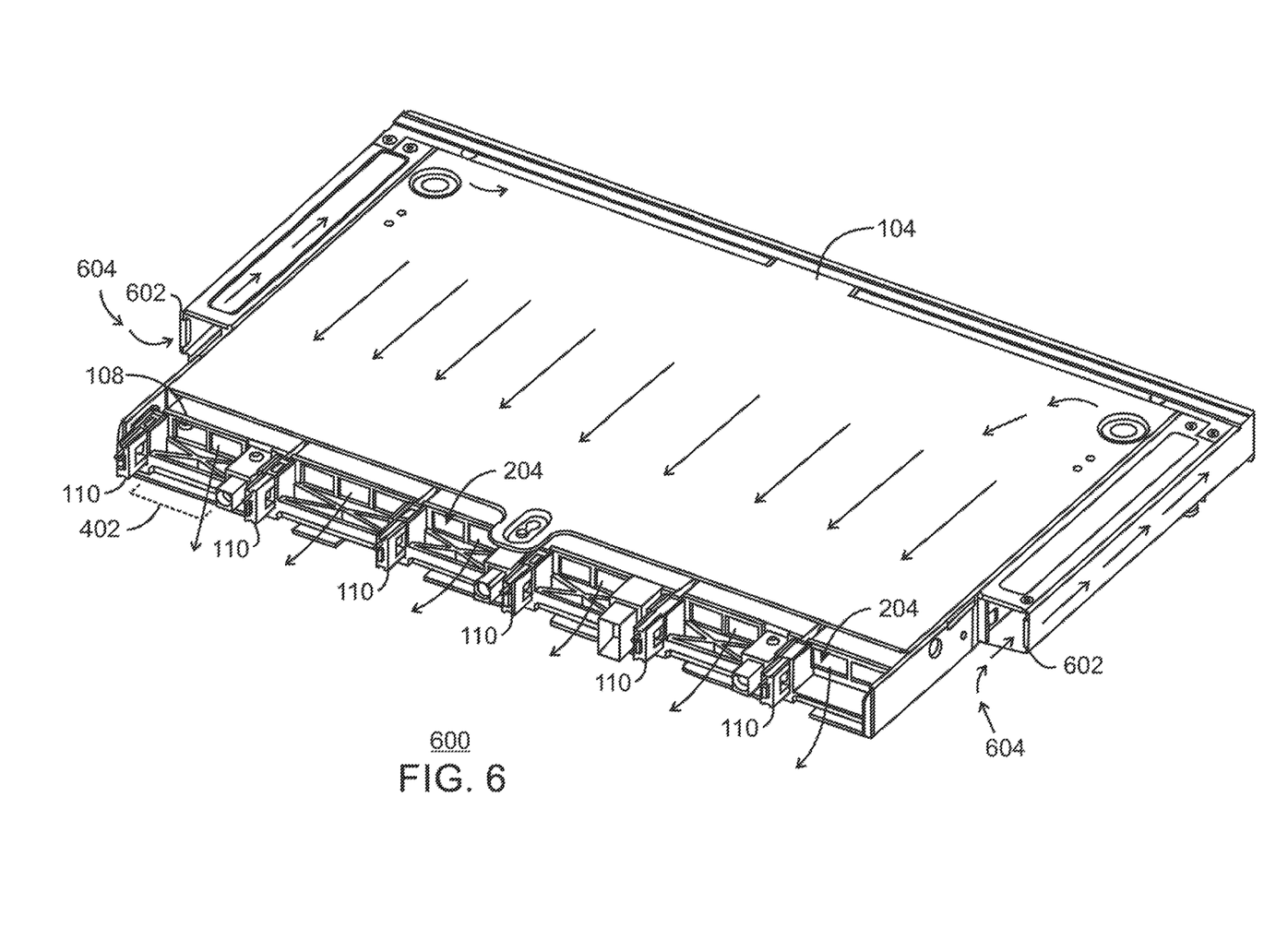
FIG. 6 is a diagram of an example assembled baffle with optical connectors showing flow.

FIG. 6 is a diagram of an example assembled baffle with optical connectors showing heat flow. Like numbered items are as described in FIG. 1, FIG. 2, and FIG. 4.

The fully assembled interconnect device 100 protects the parts it encases while also allowing proper cooling of those parts. In some examples, the flow of a heat exchanging medium may enter a port 602 on a side of the interconnect device 100. The heat exchanging medium can be air, or any other flowing gas or fluid that can aid in the cooling of the parts of an interconnect device 100 without interfering with an optical signal. In an example, the path 604 of movement of a heat exchanging medium is shown to proceed into a port 602 of the interconnect device 100. The path 604 of the heat exchanging medium then proceeds through the inside of the interconnect device 100 before flowing through the openings 204 of the baffle 108. Depending on the parts included in the interconnect device 100 various other diverting or directing parts can be included to guide the path 604 of the heat exchanging medium. This guidance can be used to steer the heat exchanging medium away from parts that it could damage or interfere with. Likewise, this guidance can be used to steer the heat exchanging medium towards parts that could use additional cooling.

Figure 7:
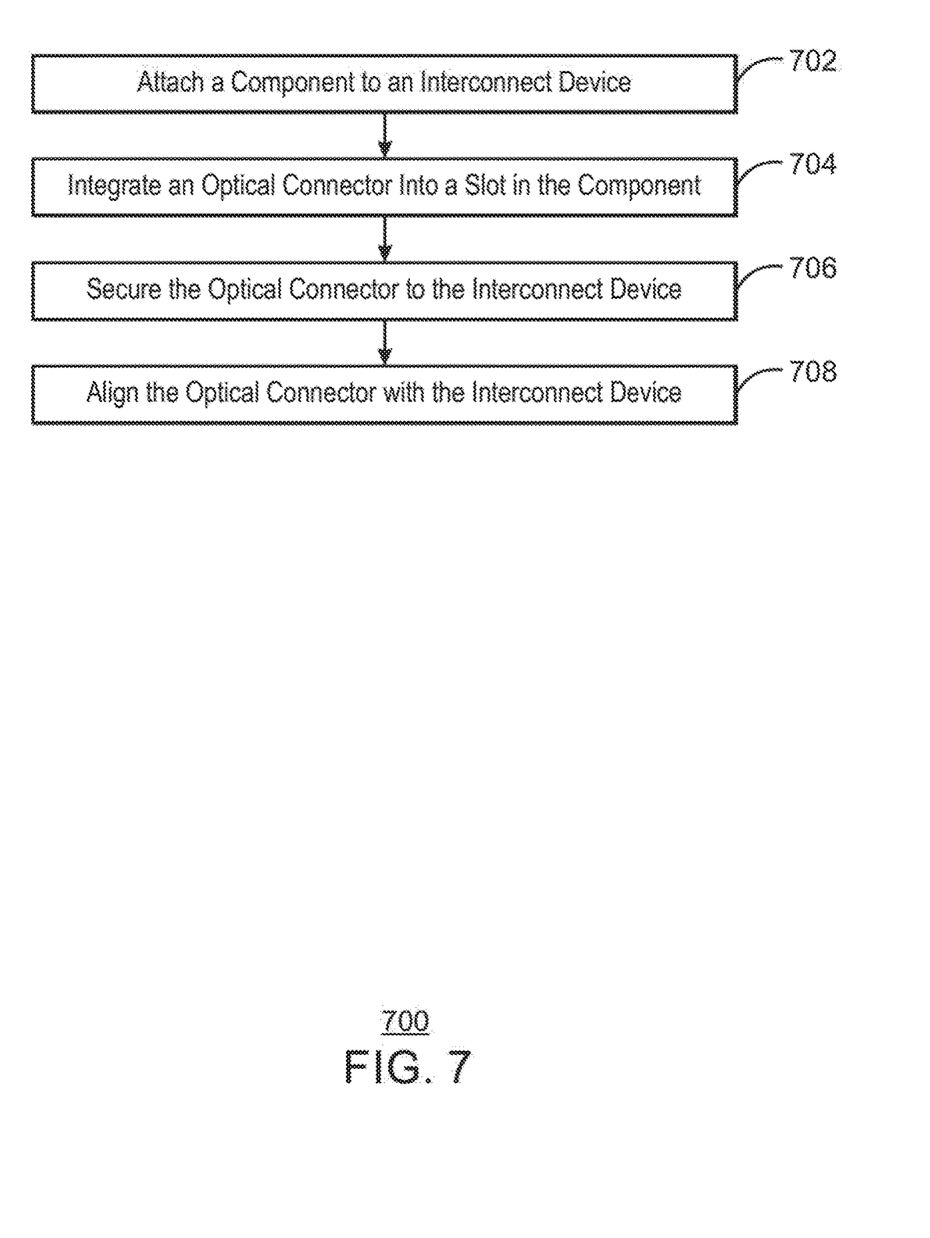
FIG. 7 is a flowchart of an example method installing a baffle with an optical connector.

FIG. 7 is a flowchart of an example method 700 of installing a baffle 108 with an optical connector 110. The example method 700 beings at block 702.

At block 702, a baffle 108, also called a component is attached to an interconnect device 100. This attachment can be aided by both a component alignment feature 114 and also an additional component alignment feature 506 depending on the position resulting in the best optical signal of the optical connector 110 to the interconnect device 100. The component or baffle 108 can also be attached with mounting screws 112 or any other suitable attaching mechanism or technology that doesn't interfere with the function of the optical fiber or optical connector 110.

At block 704, an optical connector 110 is integrated into a slot in the component or baffle 108. This integration allows the optical fiber component and the optical signal it is carrying to pass through the component or baffle 108 and directly interface with the interconnect device 100 without an intervening structure or device. The integration can also insulate the optical connector 110 from exposure to the outer edges of the component or baffle 108 to ensure that the optical connector 110 is not jostled or disconnected or misaligned during general use and installation.

At block 706, the optical connector 110 is secured to the interconnect device 100. In some examples, this securing is aided by the component or baffle 108, the slot of the component or baffle 108, the structure support 402, the optical connector alignment feature 502, or any other suitable securing device or technology. The securing of the optical connector 110 can enable the improved fit of the optical connector 110 to the interconnect device 100 even if bumped or adjusted moved or otherwise handled in a way to dislodge the optical connector 110.

At block 708, the optical connector 110 is aligned with the interconnect device 100. In some examples, this securing is aided by the component or baffle 108, the slot of the component or baffle 108, the structure support 402, the optical connector alignment feature 502, or any other suitable securing device or technology. The aligning of the optical connector 110 can enable the improved transmission of the optical signal directly to the interconnect device 100.

While the present techniques may be susceptible to various modifications and alternative forms, the techniques discussed above have been shown by way of example. It is to be understood that the technique is not intended to be limited to the particular examples disclosed herein. Indeed, the present techniques include any alternatives, modifications, and equivalents falling within the scope of the following claims.

What is claimed is:

1. An apparatus for use with an optical connector comprising:
   an interconnect device including a component to allow a heat exchanging medium to flow through a plurality of openings in the component;
   a plurality of slots to integrate the optical connector into the component, wherein each of the plurality of slots is disposed with an opening of the plurality of openings between each of the plurality of slots, and each slot of the plurality of slots secures the optical connector to the interconnect device and aligns the optical connector to enable communication with the interconnect device, wherein the optical connector provides sufficient networking capability to the interconnect device such that no communication from the interconnect device is communicated through metal wiring; and
   a structure support between each of the plurality of slots positioned perpendicular to the opening of the component.

2. The apparatus of claim 1, wherein integration of the optical connector positions an optical fiber component of the optical connector to pass through the component.

3. The apparatus of claim 1, further comprising a cable channel to allow insertion and removal of the optical connector while the component is attached to the interconnect device.

4. The apparatus of claim 1, wherein the component comprises the structure support to reinforce a slot from force generated during insertion and removal of optical connector.

5. The apparatus of claim 1, comprising:
   a component alignment feature to guide the component into a position against the interconnect device;
   an optical connector alignment feature to guide the optical connector into a slot; and
   an optical connector fastener to fasten the optical connector to the component.

6. The apparatus of claim 1, wherein the optical connector is a blind mate connector.

7. The apparatus of claim 1, further comprising a port to guide the heat exchanging medium through the interconnect device.

8. The apparatus of claim 1, further comprising an outer casing to modularize the interconnect device and allow the installation of the interconnect device into a rack.

9. A method of installing a baffle with an optical connector comprising:
- attaching, to an interconnect device, a component of the interconnect device, the component to allow a heat exchanging medium to flow through a plurality of openings in the component;
- integrating an optical connector into a slot of a plurality of slots included in the component, wherein each of the plurality of slots is disposed with an opening of the plurality of openings between each of the plurality of slots, wherein the optical connector provides networking capability to the interconnect device such that no communication from the interconnect device is communicated through metal wiring;
- securing the optical connector to the slot of the interconnect device connector, wherein a structure support between each of the plurality of slots is positioned perpendicular to the opening of the component to reinforce the slot form force generated during insertion of the optical connector; and
- aligning the optical connector with the interconnect device to enable communication with the interconnect device using the optical connector.

10. The method of claim 9, wherein integrating the optical connector positions an optical fiber component of the optical connector to pass through the component.

11. The method of claim 9, wherein the component includes a cable channel to allow insertion and removal of the optical connector while the component is attached to the interconnect device.

12. The method of claim 9, further comprising:
- guiding the component into a position against the interconnect device via a component alignment feature;
- guiding the optical connector into the slot via an optical connector alignment feature; and
- fastening the optical connector to the component via an optical connector.

* * * * *